(12) United States Patent
Amati et al.

(10) Patent No.: US 8,231,488 B2
(45) Date of Patent: Jul. 31, 2012

(54) TRANSMISSION JOINT PULLEY ASSEMBLY

(75) Inventors: Nicola Amati, Cisternino (IT);
Giancarlo Genta, Turin (IT); Andrea Tonoli, Avigliana (IT)

(73) Assignee: Dayco Europe S.r.l. con Unico Socio, Chieti (IT)

(*) Notice: Subject to any disclaimer, the term of this patent is extended or adjusted under 35 U.S.C. 154(b) by 842 days.

(21) Appl. No.: 11/718,318

(22) PCT Filed: Oct. 28, 2005

(86) PCT No.: PCT/EP2005/055643
§ 371 (c)(1),
(2), (4) Date: Dec. 10, 2008

(87) PCT Pub. No.: WO2006/045848
PCT Pub. Date: May 4, 2006

(65) Prior Publication Data
US 2009/0105021 A1    Apr. 23, 2009

(51) Int. Cl.
*F16D 3/00* (2006.01)
*F16H 55/36* (2006.01)
(52) U.S. Cl. .................. 474/94; 474/902; 474/166
(58) Field of Classification Search ............. 474/94, 474/902, 152, 161, 166; 310/103, 105
See application file for complete search history.

(56) References Cited

U.S. PATENT DOCUMENTS

| | | | |
|---|---|---|---|
| 2,471,505 A | 5/1949 | Winther | |
| 3,478,239 A | 11/1969 | Jaeschke | |
| 4,287,976 A * | 9/1981 | Sakaki et al. | 192/84.961 |
| 4,494,943 A * | 1/1985 | Takei et al. | 474/28 |
| 5,909,073 A | 6/1999 | Lamb | |
| 6,169,347 B1 * | 1/2001 | Sakamoto et al. | 310/78 |
| 7,013,859 B2 * | 3/2006 | Linnig | 123/192.1 |
| 2004/0231629 A1 * | 11/2004 | Linnig | 123/192.1 |
| 2010/0259121 A1 * | 10/2010 | Ueda et al. | 310/103 |

FOREIGN PATENT DOCUMENTS
WO    WO 98/47215    10/1998

OTHER PUBLICATIONS

PCT International Search Report for International Application No. PCT/EP2005/055643, mailed Jan. 17, 2006, 4 pages.
PCT Written Opinion for International Application No. PCT/EP2005/055643, mailed Jan. 17, 2006, 5 pages.
PCT International Preliminary Report on Patentability for International Application No. PCT/EP2005/055643, mailed Oct. 5, 2006, 8 pages.

* cited by examiner

*Primary Examiner* — Michael Mansen
*Assistant Examiner* — Juan Campos, Jr.
(74) *Attorney, Agent, or Firm* — Blakely, Sokoloff, Taylor & Zafman LLP

(57) ABSTRACT

A pulley assembly comprising a hub with an axis and adapted to be rigidly connected to a rotating shaft of an engine assembly, a turning annular pulley of ferromagnetic material supported at least indirectly on the hub, a ring of electrically conducting material rotationally connected to the hub, and at least a pair of magnets rigidly connected to the pulley and facing the ring. The pulley defines a cavity accomodating accommodating said ring.

7 Claims, 2 Drawing Sheets

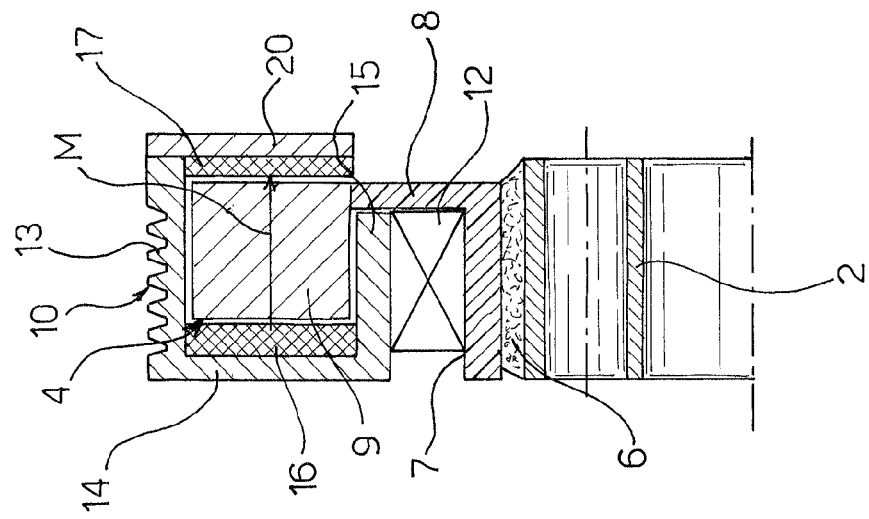
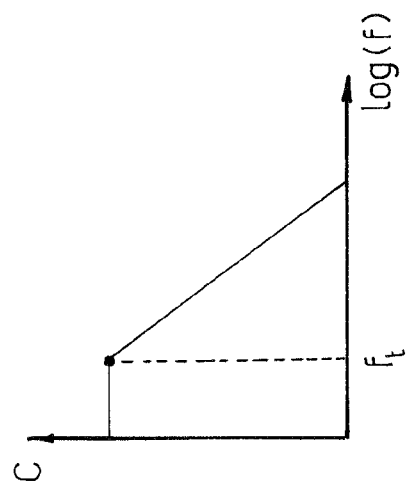
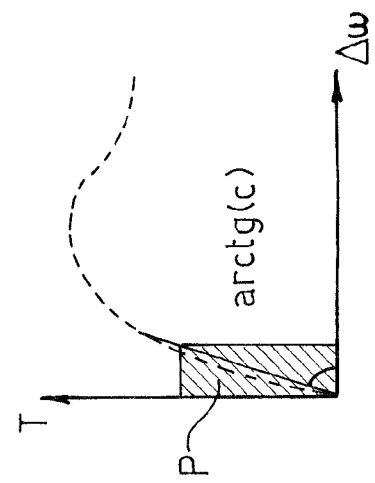
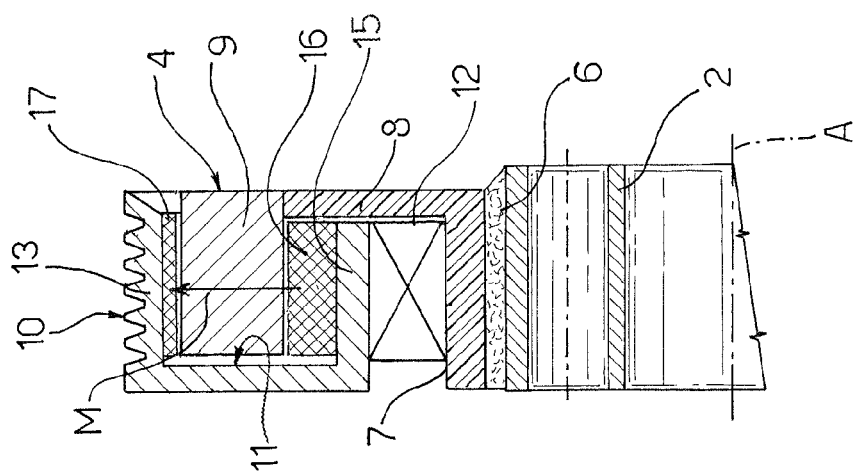

TRANSMISSION JOINT PULLEY ASSEMBLY

CROSS-REFERENCE TO OTHER APPLICATIONS

This is a National Phase of International Application No. PCT/EP2005/055643, filed on Oct. 28, 2005, which claims priority from Italian Patent Application No. TO2004A 000755, filed on Oct. 29, 2004.

TECHNICAL FIELD

The present invention relates to a transmission joint pulley assembly for an endless flexible transmission of an engine.

BACKGROUND ART

A flexible transmission, for example a belt transmission of an engine assembly presenting an endothermic engine and a plurality of accessories functionally connected to the endothermic engine by the flexible transmission, comprising generally a first turning pulley, at least one second pulley connected to an accessory and a belt wound around the pulleys to transfer the motion.

The first pulley is connected to a crankshaft of the engine and therefore the transmission is stressed by torsional vibrations whose harmful effects are generally attenuated by using dynamic dampers connected to the crankshaft and high yielding torsional joints interposed between the pulley and the crankshaft hub.

The torsional joints generally comprise a ring of elastomer material internally connected to the hub and outside the pulley, and presenting the disadvantage of deteriorating during the engine life and of having mechanical features considerably variable with temperature.

DISCLOSURE OF INVENTION

It is the object of the present invention to achieve a pulley assembly for a flexible transmission having reduced dimensions, being of simple assembly and allowing to overcome the aforementioned drawbacks.

These objects are achieved by a pulley assembly according to claim 1.

BRIEF DESCRIPTION OF THE DRAWINGS

The invention will now be described with reference to the accompanying drawings which show two non-limitative embodiments, in which:

FIG. 1 is a schematic partial diametrical section of a first embodiment of the pulley assembly according to the present invention;

FIGS. 2 and 3 are qualitative diagrams of the operational features of the pulley assembly in FIG. 1;

FIG. 4 is a schematic partial diametrical section of a second embodiment of the pulley assembly according to the present invention.

BEST MODE FOR CARRYING OUT THE INVENTION

Figure 5:
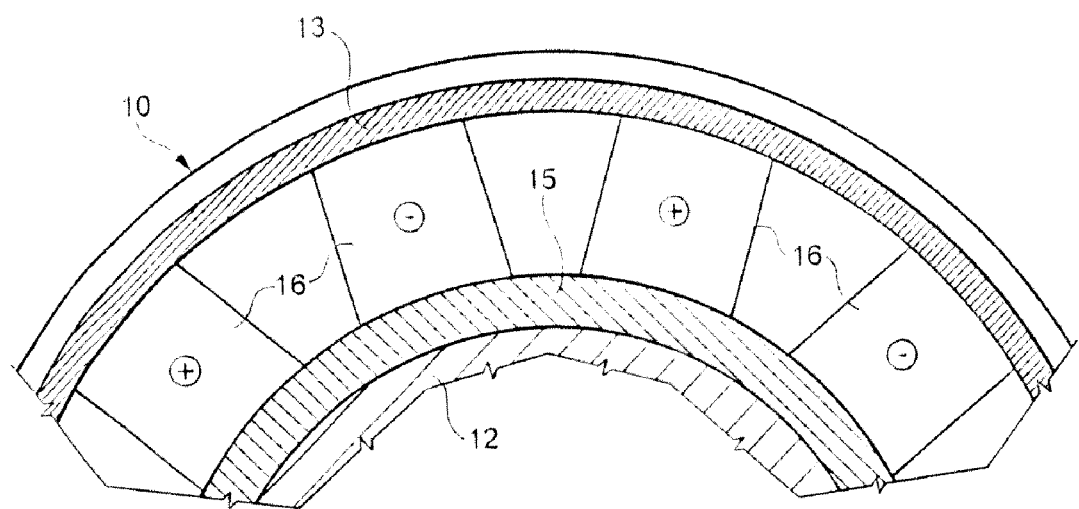
FIGS. 5 and 6 are respective partial cross section of FIG. 4.
Figure 6:
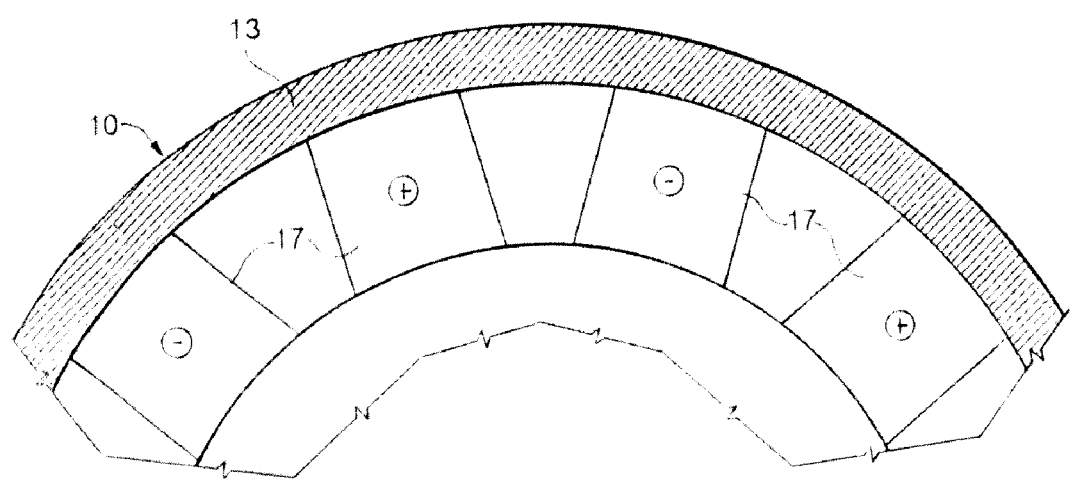

In FIG. 1, it is indicated as a whole at 1 a pulley assembly comprising a hub 2 rigidly connected to a crankshaft 3 of an endothermic engine (not shown) and having an axis A, a toroidal dynamic damper 4 defining a hole 5 accommodating the hub 2 and comprising a sleeve 6 of elastomer material connected radially to the hub 2 within the hole 5 for rotationally decoupling the hub 2 from the dynamic damper 4.

In particular, the damper 4 presents a radial 'C'-shaped section and also comprises integrally a cylindrical wall 7 concentric with the hub 2, an annular disk 8 perpendicular to the axis A and a ring 9 of electrically conducting material rigidly connected to the annular disk 8 and having the function of a seismic mass.

The pulley assembly 1 further comprises an annular pulley 10 whose radial 'C'-shaped section defines a cavity 11 adapted to accomodate with clearance the ring 9, and a bearing 12 arranged on the cylindrical wall 7 and mechanically idly supporting the pulley 10 on the damper 4.

In particular, the pulley 10 integrally comprises a grooved crown 13 of ferromagnetic material radially overlapping the ring 9 and adapted to cooperate with a belt for feeding an accessory transmission of the known type (not shown), a circular crown wall 14 perpendicular to the axis A and opposed to the circular disk 8 with respect to the ring 9 and to a cylindrical supporting wall 15 fitted on the outer ring of the bearing 12.

The pulley 10 further comprises a first and a second plurality of permanent magnets 16, 17 facing from radially opposite sides of the ring 9 and rigidly connected to the supporting wall 15 and the grooved crown 13 within the cavity 11, respectively.

Both the magnets 16 and the magnets 17 present an alternating sequence of magnetic poles of the N-S-N-S etc. type and are respectively mutually offset along a circumferential direction so that on opposite radial parts of the ring 9 there are respective opposite magnetic pairs of poles, that is if the sequence of magnets poles 16 is N-S-N-S etc. the corresponding sequence of magnets poles 17 is S-N-S-N etc. thus generating a magnetic field M having flow lines perpendicular to the axis A and passing through the ring 9 along a radial direction.

The operation of the pulley assembly 1 is as follows.

When the crankshaft 3 is stationary with respect to the grooved crown 13, for example when the engine is off, the magnets 16, 17 generate the magnetic field M that crosses the ring 9 and closes in the grooved crown 14 without induction of stray currents within the ring 9.

When the engine is cranked, the crankshaft 3 rotationally feeds the damper 4 via the viscoelastic sleeve 6. On the contrary, the grooved crown 13 remains initially stationary because it is connected to at least one rotating inertia via the transmission belt and is supported mechanically idly on the cylindrical wall 7 of the damper 4.

Therefore, the ring 9 is moved in relation to the magnetic field generated by the magnets 16, 17 and becomes the seat of induced stray currents which circulate along a closed loop perpendicular to the radial direction and arranged between two angularly adjacent magnets 16, 17.

Due then to the interaction of the magnetic field generated by the magnets 16, 17 with the stray currents induced in the ring 9, the grooved crown 13 is stressed by Lorentz's forces whose resultant generates an electromagnetic torque T capable of feeding the accessory transmission.

In particular, the electromagnetic torque T is proportional to the speed difference $\Delta\omega$ between the grooved crown 13 and the ring 9 following an operational feature typical of an asynchronous induction motor in which the inductor consists of the magnets 16, 17 and the rotor is the ring 9 (dashed line in FIG. 2).

Furthermore, for a long section from the source, the electromagnetic torque T and the angular speed difference $\Delta\omega$ are directly proportional with high estimation (solid line in FIG. 2) via a proportionality coefficient C which is thus mechanically equivalent to a constant viscous friction coefficient.

Therefore, the electromagnetic torque presents a behaviour mechanically analogous to that of a viscous torque and dissipates a power P equal to double the area subtended by the straight section of the operational feature when the pulley assembly 1 is operating at a relative speed included in the direct proportionality range.

In order to envisage a high efficiency of the pulley assembly 1 at an equivalent electromagnetic torque T, it is therefore necessary that the proportionality coefficient C is as high as possible by providing the most quantity of magnetic material used in the construction of the permanent magnets 16, 17 compatibly with the dimensions and choosing a reduced number of magnets, that is two magnets 16 and 17 respectively facing with the magnetic poles opposite and diametrically arranged each other.

Furthermore, it should be noted that the variation of the proportionality coefficient C in the frequency range defines the transmission features of the twisting vibrations between crankshaft 3 and pulley 10 by the electromagnetic torque.

In particular, it is possible to verify that as the frequency increases the proportionality coefficient C remains constant then logarithmically decreases for frequencies higher than a cut-off frequency 'ft' (FIG. 3).

The number of magnets 16, 17 quantitatively affects the rate of the proportionality coefficient C because the value of the cut-off frequency 'ft' decreases, while the value of the proportionality coefficient C along the constant section increases when the number of magnets 16, 17 decreases.

A high transmittability is the consequence of a high proportionality coefficient C value and therefore the vibrations having a lower frequency than the cut-off frequency 'ft' are transmitted from the crankshaft 3 to the pulley 10, while the vibrations having a frequency more and more far from the cut-off frequency 'ft' are progressively filtered out without reaching and damaging the accessory transmission.

Furthermore, the electromagnetic torque T is applied to the ring 9 and the inertia torques of the accessory transmission can affect via the behaviour of the proportionality coefficient C in the frequency range of the dynamic performance of the damper 4 acting as an additional damping torque arranged in series with respect to the viscoelastic sleeve 6.

From the description and operation of the present invention, the advantages that it allows to obtain are apparent.

The grooved crown 13 radially overlaps the ring 9 containing the axial dimensions and is fed by the crankshaft 3 via an electromagnetic coupling that undergoes a low deterioration in the course of time, is not subject to wear by fatigue and presents dynamic features being constant as temperature varies.

Given an equivalent generated magnetic field, using the permanent magnets is preferable whenever it is necessary to further reduce dimensions because they are capable of a high magnetic field densities.

Using a reduced number of magnets it is possible to transmit high torques at low frequency without transferring vibrations having high frequencies reducing the dynamic loads on the accessory transmission.

Furthermore, the ring 9 serves both as magnetic rotor and seismic mass allowing to reduce the number of components and to use the electromagnetic torque as further damping torque in addition to the one generated via the viscoelastic sleeve 6.

Finally, it is clear that changes and variations can be implemented to the device here described and disclosed without departing from the protective scope of the present invention, as defined by the attached claims.

In particular, the pulley assembly 1 can be applied to any endless flexible transmission, for example to a transmission comprising a chain.

The permanent magnets can be supported in a different manner with respect to the one described while having to generate a magnetic field having flow lines perpendicular to the peripheral speed direction of the ring 9. For example, the pulley 10 in FIG. 4 may include a circular crown wall 20 rigidly connected to the grooved crown 13 on the opposite side with respect to the circular crown wall 14. In this case, the magnets 16, 17 are supported within the cavity 11 by side walls on the circular crown walls 14, 20, and the magnetic field M is essentially parallel to the axis A itself.

In applications requiring particularly reduced dimensions and medium-to-low torque transmission it is possible to envisage either only the magnets 16 or only the magnetic 17 arranged on the same side as the ring 9 with the respective poles alternated.

Furthermore, the permanent magnets can be replaced by electromagnets in which is circulated a current through sliding electrical contacts, thus allowing to practice active controls acting on both the module and the direction of the electromagnetic torque.

In some applications, the ring 9 can further be rigidly connected to the hub 2 through the annular disk 8 or via a solely elastic member.

Furthermore, in all embodiments, it is possible to envisage fitting the bearing 12 directly on the hub 2.

It is also possible to envisage using the pulley assembly 1 as a pulley rigidly connected to a rotating shaft of an accessory of the endothermic engine assembly. Preferably, in this application, the annular disk 8 is rigidly connected to the hub 2 making the hub 2 integral with the ring 9.

What is claimed is:

1. A pulley assembly for an accessory drive of an internal combustion engine comprising a hub with an axis (A), an annular pulley of ferromagnetic material radially supported at least indirectly on said hub, a ring of electrically conducting material rotationally connected to and radially supported on said hub, and at least a pair of magnets rigidly connected to said pulley and facing said ring, said pulley defining a cavity accommodating said ring said at least pair of magnets defining an alternating sequence of poles and being arranged so as to induce an electric current within said ring when the ring rotationally moves with respect to said magnets; a dynamic damper having an elastic sleeve or viscoelastic sleeve adapted to connect said ring to said hub, wherein said damper comprises a rigid supporting element essentially perpendicular to said axis (A) and connected to said ring and to said elastic sleeve or viscoelastic sleeve, wherein said damper comprises a cylindrical wall rigidly connected to said supporting element and accommodating said elastic sleeve or viscoelastic sleeve and said hub, and comprising a bearing fitted on said damper and supporting said pulley.

2. A pulley assembly according to claim 1, comprising said damper fitted on said hub and supporting said pulley.

3. A pulley assembly according to claim 1, wherein said ring is rigidly connected to said hub via an annular wall.

4. A pulley assembly according to claim 1, wherein said pulley comprises a radially extreme crown and a first and second annular walls perpendicular to said axis (A), respectively arranged by parts axially opposite to said ring, said first and second annular walls supporting said at least two magnets.

5. A pulley assembly according to claim 1, wherein said pulley comprises a radially extreme crown, an annular wall perpendicular to said axis (A), and a cylindrical wall defining said cavity, said crown and said cylindrical wall supporting said at least two magnets.

6. A pulley assembly according to claim 1, wherein said magnets are permanent.

7. A pulley assembly according to claim 1, wherein said magnets are electromagnets.

* * * * *

UNITED STATES PATENT AND TRADEMARK OFFICE
CERTIFICATE OF CORRECTION

Page 1 of 1

PATENT NO. : 8,231,488 B2
APPLICATION NO. : 11/718318
DATED : July 31, 2012
INVENTOR(S) : Nicola Amati, Giancarlo Genta and Andrea Tonoli It is certified that error appears in the above-identified patent and that said Letters Patent is hereby corrected as shown below:

Cover page after "US 2009/0105021 A1 Apr. 23, 2009" of item (65), insert item (30) as follows:

-- (30) Foreign Application Priority Data
Oct. 29, 2004 [IT] ......... TO2004A 000755 --

Signed and Sealed this
Twenty-seventh Day of November, 2012

David J. Kappos
*Director of the United States Patent and Trademark Office*